United States Patent [19]

Kopeika

[11] 4,013,035
[45] Mar. 22, 1977

[54] BALLOON SIGNAL ASSEMBLY

[76] Inventor: Saul Z. Kopeika, 310 Concord Road, Aston, Pa. 19014

[22] Filed: July 18, 1975

[21] Appl. No.: 596,987

[52] U.S. Cl. .................... 116/124 B; 116/DIG. 8; 116/DIG. 9
[51] Int. Cl.² ......................................... B64B 1/52
[58] Field of Search ............... 116/DIG. 9, DIG. 8, 116/124 B; 9/319, 9; 137/223

[56] References Cited

UNITED STATES PATENTS

| | | | |
|---|---|---|---|
| 2,862,531 | 12/1958 | Walker | 116/124 B |
| 3,007,483 | 11/1961 | Keefe | 116/124 B |
| 3,070,818 | 1/1963 | Fairchild | 116/124 B |
| 3,171,128 | 2/1965 | Shattuck | 116/DIG. 9 |
| 3,174,455 | 3/1965 | Peterson | 116/DIG. 9 |
| 3,279,419 | 10/1966 | Demarco | 116/124 B |
| 3,310,024 | 3/1967 | McConnel | 116/124 B |
| 3,547,073 | 12/1970 | Colandrea | 116/124 B |
| 3,721,983 | 3/1973 | Sherer | 116/124 B |

*Primary Examiner*—S. Clement Swisher
*Assistant Examiner*—Denis E. Corr
*Attorney, Agent, or Firm*—Nelson E. Kimmelman

[57] ABSTRACT

The signal assembly includes an inflatable ballon capable of retaining a lighter-than-air gas connected to a container of the gas under pressure. A seal is provided to prevent the contents of the container from being released into the balloon. The container has a manually yieldable and resilient wall portion to which a needle or equivalent is connected so that, upon inward pressure on the resilient wall portion, the needle breaks the seal. When the manual pressure is released, the restorative action of the resilient wall portion causes the needle to withdraw from the seal leaving a punctured passageway through which gas flows from the container into the balloon. A one-way valve may be provided adjacent the seal to prevent reentry of the gas from the balloon into the container.

13 Claims, 5 Drawing Figures

BALLOON SIGNAL ASSEMBLY

BACKGROUND OF THE INVENTION

1. Field of the Invention

This invention relates to a balloon signal assembly and in particular to a novel signal assembly comprising a tethered balloon and a container of pressurized lighter-than-air gas connected to the balloon.

2. Prior Art

There have been a number of forms of signal assemblies which include a balloon, a container of lighter-than-air gas attached to attachable to the balloon for inflating it which is made of a substantially rigid material, and a line which tethers it to a person or thing on the ground. Those assemblies are useful as emergency signals for downed pilots, people lost in forests or jungles, or for enabling radar to have a locating target. Usually there is provided a relatively complicated mechanism for breaking a seal that ordinarily prevents escape of the gas from the container into the balloon. They involve relatively complicated valve stem apparatus or a revolvable handle or several revolvable knurled nuts or require other screwing action. The mechanism and method for breaking the seal is often of such complexity that at a moment of trauma, which is when the device is usually used, the victim or operator may not easily operate the device because of his or her confused mental state. Also, it would be useful for children or those not speaking the language of instructions accompanying the signal assembly to employ a device of this type which by simple manual pressure at a designated point performs the seal-puncturing operation to inflate the balloon. It is therefore one of the objects of the present invention to provide a very simple balloon signal assembly having a direct and relatively foolproof method for activating the device. It is also among the objects of the present invention to provide a balloon signal assembly which is inexpensive to manufacture and, therefore, can be sold at a much lower price than has hitherto been the case.

BRIEF SUMMARY OF THE INVENTION

A signal assembly which includes an inflatable means capable of retaining a lighter-than-air gas, a container of the said gas which has a manually yieldable and resilient wall portion, a seal for preventing release of the gas from the container into the inflatable means, means for breaking or puncturing the seal upon inward manual pressure on the resilient wall portion so that gas can flow through the punctured seal into the inflatable means.

DETAILED DESCRIPTION OF THE DRAWINGS

Figure 1:
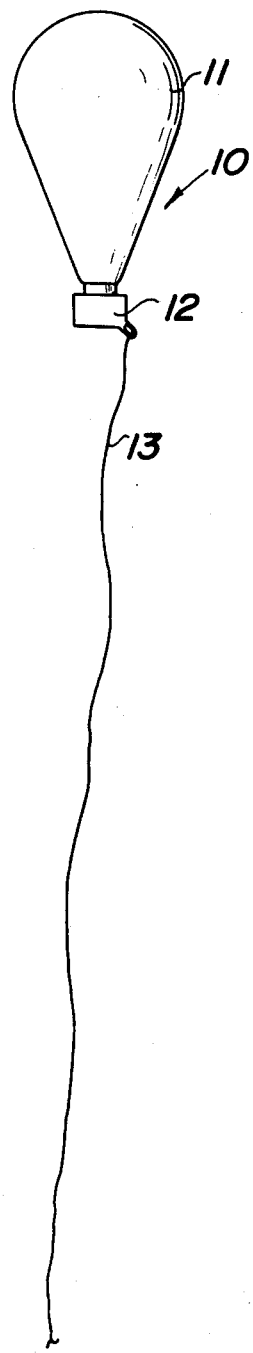
FIG. 1 is a side-elevation view of the device as used in an emergency situation.
Figure 2:
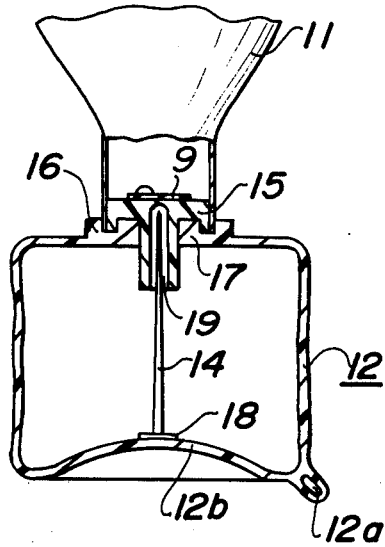
FIG. 2 is a side-elevation, partly in section of one form of the present invention.

Referring to FIGS. 1-2, there is shown the signal assembly indicated generally at the numeral 10 which comprises an inflatable balloon or balloon-type member 11 connected to a container 12 having a perforated tab portion 12a to which the upper end of a tether or line 13 is fixed, the lower end being held manually or being anchored to a fixed or heavy object.

The balloon 11 may be made of plastic, woven or other resilient material coated or uncoated capable of holding a lighter-than-air gas such as helium, for example. If the balloon is intended to provide a target for radar waves it may be coated with an appropriate metallized layer that will reflect those waves. Alternatively, it may be coated with a highly visible paint containing, for example, daylight-fluorescing phosphor materials.

The neck of the balloon 11 is secured to the top central portion 16 of the container 12. In the form of the invention shown in FIG. 2, the end of the balloon is secured between the inner wall of the ring 16 of container 12 and the outer top edge of the T-sectioned seal member 15. The container 12 is made of a plastic material having strength sufficient to contain the pressurized gas without deformation and light enough not to impair to any great extent the lifting power of the balloon.

The T-sectioned member 15 has a top central region which is quite thin and capable of being ruptured by the point of the elongated needle member 14 which may be made of metal or other sufficiently rigid material, for example. The base of the needle 14 is affixed to a disc 18 that is adhered to the concave wall portion 12b of the container. The upper part of the needle 14 is disposed along the axis of the passageway 19 formed in the member 15.

When it is desired to operate the signalling assembly, the operator presses with his thumbs or hand upward against the wall portion 12b thereby moving the tip of the needle into contact with the thin central portion of the seal member 15 and eventually piercing it. When the inward manual pressure on the wall portion 12b is released, the resilience of the portion 12b withdraws the tip of the needle from the broken seal to its original position. However, the lighter-than-air gas pressurized within container 12 then is released to flow through the rupture made in the seal 15 into the balloon 11. A one-way flap or equivalent valve 9 may optionally be provided over the pierced region of the seal to prevent return of the gas from the balloon 11 into the container 12. This valve, which is also referred to in connection with the other embodiments of the invention to be described below is not absolutely necessary, but may help in utilizing most of the gas originally in the container 12 to inflate the balloon 11.

Figure 3:
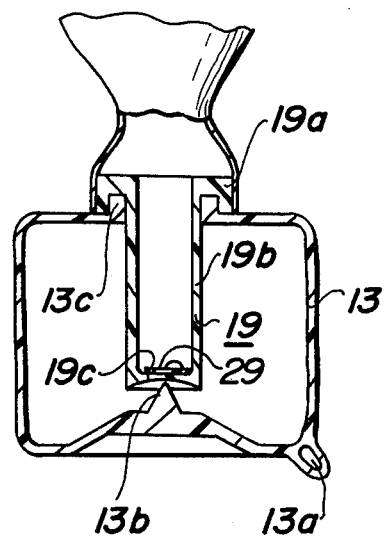
FIG. 3 is a side-elevation, partly in section of another form of the present invention.

FIG. 3 shows still another form of the invention in which the balloon 11 is fastened around the top annular portion 19a of a generally hollow cylindrical seal member 19 having a thin lower end portion 19c. The top of member 19 is affixed, in turn, over and to the ring-like top rim 13c of the container 13, by appropriate adhesives or by heat sealing, for example. Instead of having a separate seal-piercing member, the lower wall portion of the container 13 is made generally concave and has a thickened central portion with a relatively rigid point 13b formed in it. The tip of this point 13b is very close to the thin wall portion 19c of the seal member 19. The rest of the bottom of the container 13 is thinner than the central portion so as to permit inward flexion of that wall. When manual pressure is exerted inwardly on the concave bottom of the container 13, the thickened point 13b ruptures the seal 19c. When the inward manual pressure is released, the resilience of the bottom withdraws the point from the seal thereby allowing a flow of the gas into the balloon. Optionally, the flap valve 29 or equivalent means is placed just above the point of rupture to prevent the flow of gas from reversing direction through the seal member 19.

Figure 4:
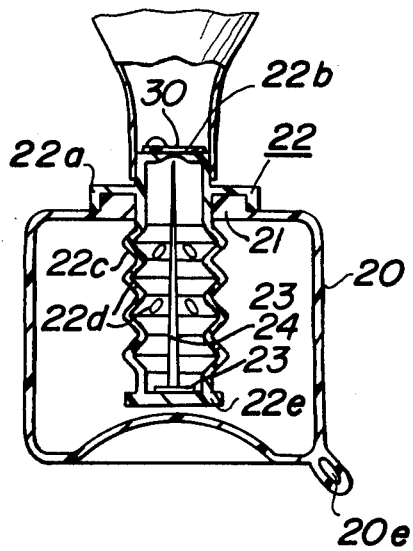
FIG. 4 is a side elevation, partly in section of a third form of the present invention.

FIG. 4 shows still another form of the invention in which there is a generally cylindrical and axially displaceable seal member 22 having an upper annular portion 22a that fits onto the upper portion 21 of container 20 to which it is fixed by adhesives or other appropriate sealing methods. The balloon 11 is sealed to the upper portion of the member 22 in any known fashion. There is a thin upper seal 22b area just above the tip of an elongated rigid needle member 24 that is fixed to a disc 23 that is fixed to the lower end 22e of the tubular portion of the seal 22. The vertical walls 22c are bellows-like in construction so that pressure upward from below on its lower end 22e causes the walls 22c to be compressed and release of that pressure allows them to decompress. The tubular wall 22c is provided with a number of apertures 22d through which the pressurized gas within container 20 may enter the tubular column and, ultimately, exit through the punctured seal member 22b. As in the former embodiments a check or other one-way valve 30 is installed near the break point on the seal. Also, as in the former embodiments, inward normal pressure on the concave bottom portion causes the needle point to break the seal whereupon gas flows out from the higher pressure confines of the container 20 to the balloon 11 via the valve 30.

Figure 5:
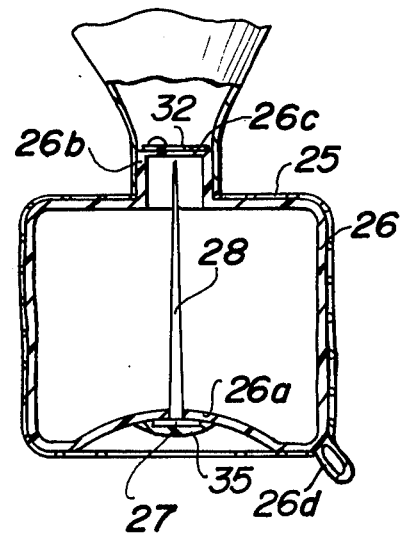
FIG. 5 is a side-elevation, partly in section of still another form of the present invention.

FIG. 5 shows still another form of the invention in which the seal 26c is formed integrally with the container 26 near its upper neck portion 26b. A long rigid needle 28 is fastened through an opening in the concave resilient wall portion 26a to a disc 27 positioned below. The disc 27 is covered over with an appropriate sealant 35 such as plastic or plastic glue. Around the container 26 and in contact with it, is a netting or other similar type of restraint 25 which helps to keep the pressurized gas from bulging out the walls of the container 26. At the bottom of the container 26, there may be an opening in the netting so as to allow a thumb to press upward on the sealant 35 which thereupon bows the concave portion 26a even more and causes the point of the needle 28 to puncture the seal 26c. Upon release of the manual pressure, the concave portion 26a restores itself to its original position thereby withdrawing the needle 28 from the puncture and allowing the pressurized gas to proceed through the punctured portion, through a flap seal 32 and into the balloon 11.

I claim:

1. A signal assembly comprising:
   a. an inflatable means capable of retaining a lighter-than-air gas,
   b. a container of said gas under pressure, said container being connected to said inflatable means and including a manually yieldable and resilient wall portion,
   c. seal means connected to said container for preventing release of said gas from said container into said inflatable means, and
   d. means in proximity to said wall portion and to said seal for breaking said seal upon inward manual pressure on said wall portion whereby gas flows into said inflatable means through said broken seal, said (d) means including a pointed rigid portion which is brought into piercing contact with said seal means when said inward pressure is exerted upon said wall portion and said wall portion withdraws said pointed portion from contact with said seal means when no inward pressure is exerted on said wall portion.

2. The signal assembly according to claim 1 wherein said pointed portion is attached to said wall portion.

3. The signal assembly according to claim 1 wherein said pointed portion is integrally formed with said wall portion.

4. The signal assembly according to claim 1 wherein said wall portion is concave relative to the other parts of the wall of the container.

5. The signal assembly according to claim 1 wherein said wall portion is disposed generally centrally on the bottom of said container.

6. The signal assembly according to claim 1 wherein said container is provided with means to which a tether line may be secured.

7. The signal assembly according to claim 1 wherein said (c) means is located toward the top of said (b) container and said pointed portion of said (d) means is elongated and extends from near said wall portion to within a short distance from said (c) means.

8. The signal assembly according to claim 1 wherein said (c) means is located toward the bottom of said (b) container and said pointed portion of said (d) means is short and extends only a relatively short distance from said wall portion.

9. The signal assembly according to claim 1 wherein said container is made of a plastic material.

10. The signal assembly according to claim 1 with the addition of restraining means external to and in contact with the outer surface of said container.

11. The signal assembly according to claim 1 wherein said (d) means comprises a generally hollow cylindrical portion having bellows-type walls closed off at one end by a wall on which the base of a needle is mounted, the other end of said cylindrical portion being connected to said (c) seal means.

12. The signal assembly according to claim 1 wherein said container is made of a non-rigid plastic material.

13. The signal assembly according to claim 1 with the addition of one-way valve means through which said gas flows from said container into said balloon but which prevents said gas from flowing backward into said container.

* * * * *